US012212759B2

(12) United States Patent
Hu

(10) Patent No.: US 12,212,759 B2
(45) Date of Patent: Jan. 28, 2025

(54) POINT CLOUD ENCODING AND DECODING METHOD AND APPARATUS, COMPUTER-READABLE MEDIUM, AND ELECTRONIC DEVICE

(71) Applicant: TENCENT TECHNOLOGY (SHENZHEN) COMPANY LIMITED, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 146 days.

(21) Appl. No.: 17/985,664

(22) Filed: Nov. 11, 2022

(65) Prior Publication Data
US 2023/0082784 A1 Mar. 16, 2023

Related U.S. Application Data

(63) Continuation of application No. PCT/CN2022/076405, filed on Feb. 16, 2022.

(30) Foreign Application Priority Data

Mar. 31, 2021 (CN) .......... 202110351657.2

(51) Int. Cl.
G06T 9/00 (2006.01)
H03M 7/30 (2006.01)
(Continued)

(52) U.S. Cl.
CPC ......... *H04N 19/154* (2014.11); *H04N 19/172* (2014.11); *H04N 19/463* (2014.11); *H04N 19/70* (2014.11)

(58) Field of Classification Search
CPC .. H04N 19/154; H04N 19/172; H04N 19/463; H04N 19/70; H04N 19/597;
(Continued)

(56) References Cited

U.S. PATENT DOCUMENTS 10,404,411 B2 9/2019 Chen et al.
10,542,297 B2 1/2020 Chen et al.
(Continued)

FOREIGN PATENT DOCUMENTS

CN 112153391 A 12/2020
CN 112492385 A 3/2021
(Continued)

OTHER PUBLICATIONS

The World Intellectual Property Organization (WIPO) International Search Report for PCT/CN2022/076405 Apr. 19, 2022 7 Pages (including translation).
(Continued)

*Primary Examiner* — Howard D Brown, Jr.
(74) *Attorney, Agent, or Firm* — ANOVALAW GROUP PLLC

(57) ABSTRACT

A point cloud decoding method includes: receiving a point cloud file transmitted by a data source, the point cloud file including at least one point cloud media track; parsing file encapsulation information of the at least one point cloud media track, to obtain quality indication information carried in the file encapsulation information, the quality indication information being used for representing point cloud quality of the at least one point cloud media track; and selecting and decoding a point cloud media track with designated point cloud quality from the point cloud file according to the quality indication information carried in the file encapsulation information.

20 Claims, 10 Drawing Sheets

(51) Int. Cl.
*H04L 65/70* (2022.01)
*H04N 19/154* (2014.01)
*H04N 19/172* (2014.01)
*H04N 19/463* (2014.01)
*H04N 19/70* (2014.01)

(58) Field of Classification Search
CPC .......... H04N 21/8456; H04N 21/85406; G06T 9/00; H04L 65/60; H04L 67/06; H04L 67/10; H04L 69/04
See application file for complete search history.

(56) References Cited

U.S. PATENT DOCUMENTS

| | | | |
|---|---|---|---|
| 10,623,635 | B2 | 4/2020 | Wang et al. |
| 10,742,999 | B2 | 8/2020 | Wang et al. |
| 10,805,620 | B2 | 10/2020 | Wang et al. |
| 10,820,025 | B2 | 10/2020 | Wang-Lin et al. |
| 10,924,820 | B2 | 2/2021 | Chen et al. |
| 10,951,874 | B2 | 3/2021 | Chen et al. |
| 11,139,000 | B2 | 10/2021 | Wang et al. |
| 11,197,040 | B2 | 12/2021 | Wang et al. |
| 2018/0075576 | A1 | 3/2018 | Liu et al. |
| 2019/0019218 | A1 | 1/2019 | Thompson et al. |
| 2020/0020133 | A1* | 1/2020 | Najaf-Zadeh ............. G06T 9/00 |
| 2020/0382764 | A1 | 12/2020 | Oyman et al. |
| 2021/0019936 | A1 | 1/2021 | Oyman |
| 2021/0264641 | A1* | 8/2021 | Iguchi .................. H04N 19/436 |
| 2022/0036593 | A1 | 2/2022 | Takahashi et al. |
| 2023/0061573 | A1* | 3/2023 | Hu ....................... H04N 19/597 |
| 2023/0082784 | A1* | 3/2023 | Hu ....................... H04N 19/172 375/240.26 |

FOREIGN PATENT DOCUMENTS

| | | |
|---|---|---|
| CN | 112583803 A | 3/2021 |
| CN | 113709093 A | 11/2021 |
| WO | 2020137642 A1 | 7/2020 |

OTHER PUBLICATIONS

Shuai Zhao et al., "Study of User QoE Improvement for Dynamic Adaptive Streaming Over HTTP (MPEG-DASH)",2017, pp. 566-570. International Conference on Networking and Communications (ICNC).

Xiang Zhang et al., "Linear Model based Geometry Coding for Lidar Acquired Point Clouds", 2020, pp. 406-406. 2020 Data Compression Conference (DCC), Snowbird, UT, USA.

Min Zhang et al., "PointHop: An Explainable Machine Learning Method for Point Cloud Classification", 2000, IEEE TMM.

Li Li et al., "Occupancy-Map-Based Rate Distortion Optimization for Video-Based Point Cloud Compression", 2019, ICIP.

Li Li et al., "Occupancy-map-based Rate Distortion Optimization and Partition for Video-based Point Cloud Compression", 2020, IEEE TCSVT.

Li Li et al., "Video-based compression for plenoptic point clouds", arXiv:1911.01355.

Li Li et al., "λ-domain Perceptual Rate Control for 360-degree Video Compression", 2020, IEEE Journal on Selected Topics in Signal Processing.

Li Li et al., "Rate Control for Video-based Point Cloud Compression", 2020, IEEE TIP.

Li Li et al., "Efficient Projected Frame Padding for Video-based Point Cloud Compression", 2019, IEEE TMM.

Min Zhang et al., "Unsupervised Feedforward Feature (UFF) Learning for Point Cloud Classification and Segmentation", Dec. 1-4, 2020, 2020 IEEE International Conference on Visual Communications and Image Processing (VCIP), Macau.

Pranav Kadam et al., "Unsupervised Point Cloud Registration via Salient Points Analysis (SPA)", Dec. 1-4, 2020, 2020 IEEE International Conference on Visual Communications and Image Processing (VCIP), Macau.

Sejin Oh et al., "Draft text of ISO/IEC FDIS 23090-18 Carriage of Geometry-based Point Cloud Compression Data", ISO/IEC JTC 1/SC 29/WG 03 N0311.

"Information technology—Coding of audio-visual objects—Part 12: ISO base media file format", Sep. 2022, ISO/IEC JTC 1/SC 29/WG 11.

* cited by examiner

| seq_parameter_set( ) { | Descriptor |
|---|---|
| main_profile_compatibility_flag | u(1) |
| reserved_profile_compatibility_22bits | u(22) |
| unique_point_positions_constraint_flag | u(1) |
| level_idc | u(8) |
| bitrate | u(32) |
| frame_rate | u(8) |
| sps_seq_parameter_set_id | ue(v) |
| sps_bounding_box_present_flag | u(1) |
| ... | ... |
| } | |

POINT CLOUD ENCODING AND DECODING METHOD AND APPARATUS, COMPUTER-READABLE MEDIUM, AND ELECTRONIC DEVICE

RELATED APPLICATION(S)

This application is a continuation application of PCT Patent Application No. PCT/CN2022/076405 filed on Feb. 16, 2022, which claims priority to Chinese Patent Application No. 202110351657.2, entitled "POINT CLOUD ENCODING AND DECODING METHOD AND APPARATUS, COMPUTER-READABLE MEDIUM, AND ELECTRONIC DEVICE" and filed on Mar. 31, 2021, all of which are incorporated herein by reference in entirety.

FIELD OF THE TECHNOLOGY

The present disclosure relates to the field of computer and communication technologies, and in particular, to a point cloud encoding and decoding method, a point cloud encoding and decoding apparatus, a computer-readable medium, and an electronic device.

BACKGROUND

A point cloud is a set of discrete points that are distributed in space and express the spatial structure and surface attributes of a three-dimensional object or scene. After point cloud data is obtained through a point cloud collection device, the point cloud data may be encoded and encapsulated, to be transmitted and presented to a user.

SUMMARY

Embodiments of the present disclosure provide a point cloud encoding and decoding method, a point cloud encoding and decoding apparatus, a computer-readable medium, and an electronic device.

In one aspect, the present disclosure provides a point cloud decoding method, including: receiving a point cloud file transmitted by a data source, the point cloud file including at least one point cloud media track; parsing file encapsulation information of the at least one point cloud media track, to obtain quality indication information carried in the file encapsulation information, the quality indication information being used for representing point cloud quality of the at least one point cloud media track; and selecting and decoding a point cloud media track with designated point cloud quality from the point cloud file according to the quality indication information carried in the file encapsulation information.

In another aspect, the present disclosure provides a point cloud decoding apparatus, including: a memory storing computer program instructions; and a processor coupled to the memory and configured to execute the computer program instructions and perform: receiving a point cloud file transmitted by a data source, the point cloud file including at least one point cloud media track; parsing file encapsulation information of the at least one point cloud media track, to obtain quality indication information carried in the file encapsulation information, the quality indication information being used for representing point cloud quality of the at least one point cloud media track; and selecting and decoding a point cloud media track with designated point cloud quality from the point cloud file according to the quality indication information carried in the file encapsulation information In yet another aspect, the present disclosure provides a point cloud encoding method, including: encoding to-be-transmitted point cloud data according to different encoding standards, to obtain point cloud bitstreams that have the same point cloud content and have different point cloud quality; filling, according to the encoding standards, the point cloud bitstreams with quality indication information used for representing the point cloud quality; and encapsulating the point cloud bitstreams as point cloud media tracks, and filling the point cloud media tracks with the quality indication information corresponding to the point cloud bitstreams.

In yet another aspect, the present disclosure provides a point cloud encoding apparatus, including: a memory storing computer program instructions; and a processor coupled to the memory and configured to execute the computer program instructions and perform: encoding to-be-transmitted point cloud data according to different encoding standards, to obtain point cloud bitstreams that have the same point cloud content and have different point cloud quality; filling, according to the encoding standards, the point cloud bitstreams with quality indication information used for representing the point cloud quality; and encapsulating the point cloud bitstreams as point cloud media tracks, and filling the point cloud media tracks with the quality indication information corresponding to the point cloud bitstreams.

In yet another aspect, the present disclosure provides a computer-readable medium, storing a computer program, the computer program, when executed by a processor, implementing the method in the above technical solutions.

In the technical solutions provided in the embodiments of the present disclosure, by adding quality indication information used for representing point cloud quality to a point cloud data encoding and file encapsulation process, quality scales of a point cloud file and components (geometry, attribute and the like) may be definitely indicated, so that a client can request the corresponding point cloud file more precisely, and can also select corresponding components according to performance conditions of the client itself during decoding and presentation.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
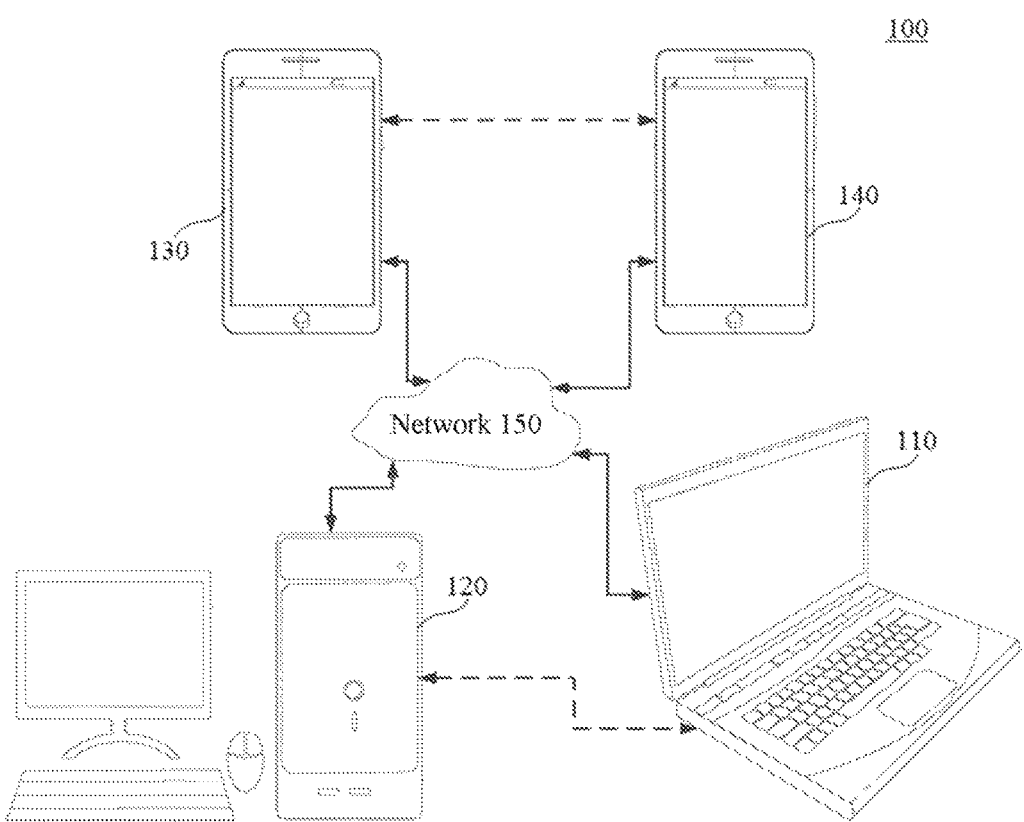
FIG. 1 is a schematic diagram of an exemplary system architecture according to certain embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

Exemplary implementations are described comprehensively with reference to the accompanying drawings. However, the exemplary implementations may be implemented in various forms, and are not to be understood as being limited to the examples described herein. Instead, the implementations are provided to make the present disclosure more thorough and complete and convey the idea of the exemplary implementations to a person skilled in the art.

In addition, the described features, structures, or characteristics may be combined in one or more embodiments in any appropriate manner. In the following descriptions, a lot of specific details are provided to give a full understanding of the embodiments of the present disclosure. However, a person skilled in the art is to be aware of that, the technical solutions in the present disclosure may be implemented without one or more of the particular details, or other methods, unit, apparatus, or step may be adopted. Well-known methods, apparatuses, implementations, or operations are not shown or described in detail, to avoid obscuring the aspects of the present disclosure.

The block diagrams shown in the accompanying drawings is merely a functional entity and does not necessarily correspond to a physically independent entity. To be specific, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

A point cloud is a set of discrete points that are distributed in space and express the spatial structure and surface attributes of a three-dimensional object or scene. Each point in the point cloud has at least three-dimensional position information, and may further have color information, material information or other information according to different implementation scenarios. Usually, all points in the point cloud have the same number of additional attributes. Point cloud media encoding manners may be further divided into Video-based Point Cloud Compression (VPCC) and Geometry-based Point Cloud Compression (GPCC). During point cloud file encapsulation, three-dimensional position information is usually referred to as a geometry component of a point cloud file, and attribute information is referred to as an attribute component of the point cloud file. One point cloud file may have only one geometry component, but may have one or more attribute components.

The point cloud may flexibly and conveniently express the spatial structure and surface attributes of the three-dimensional object or scene, and therefore is applied widely, and main implementation scenarios of the point cloud may be classified as two main categories. 1) Machine perception point cloud, for example, an autonomous navigation system, a real-time preventive maintenance inspection system, a geographic information system, a vision sorting robot, or a rescue and relief robot. 2) Human eye perception point cloud, for example, digital culture heritage, free viewpoint broadcasting, three-dimensional immersion communication, three-dimensional immersion interaction, or another point cloud implementation scenario.

The point cloud is obtained using the following approaches: computer generating, 3D laser scanning, 3D photogrammetry and the like. A computer may generate a point cloud of a virtual three-dimensional object or scene. 3D scanning may obtain a point cloud of a static real-world three-dimensional object or scene, and may obtain a million-level point cloud per second. 3D photographing may obtain a point cloud of a dynamic real-world three-dimensional object or scene, and may obtain a ten-million-level point cloud per second. Moreover, in the medical field, a point cloud of a biological tissue or organ may be obtained according to MRI, CT, or electromagnetic positioning information. These technologies reduce the costs and period of obtaining point cloud data, and improve precision of the data. A revolution in point cloud data obtaining manners makes it possible to obtain a large quantity of point cloud data. With continuous accumulation of a huge mass of point cloud data, efficient storage, transmission, publishing, sharing and standardization of the point cloud data become a key to point cloud application.

After point cloud media are encoded, an encoded data stream may be encapsulated and transmitted to a user. Correspondingly, at the end of a point cloud media player, a point cloud file may be first decapsulated and decoded, and finally the decoded data stream is presented.

FIG. 1 is a schematic diagram of an exemplary system architecture to which a technical solution according to an embodiment of the present disclosure is applicable.

As shown in FIG. 1, the system architecture 100 includes a plurality of terminal apparatuses, and the terminal apparatuses may communicate with each other through, for example, a network 150. For example, the system architecture 100 may include a first terminal apparatus 110 and a second terminal apparatus 120 interconnected through the network 150. In the embodiment in FIG. 1, the first terminal apparatus 110 and the second terminal apparatus 120 perform unidirectional data transmission.

For example, the first terminal apparatus 110 may encode point cloud data (for example, a point cloud bitstream collected by the first terminal apparatus 110) and transmit the encoded point cloud data to the second terminal apparatus 120 through the network 150, the encoded point cloud data is transmitted in the form of one or more encoded point cloud bitstreams, and the second terminal apparatus 120 may receive the encoded point cloud data from the network 150, decode the encoded point cloud data and display the decoded point cloud data.

In an embodiment of the present disclosure, the system architecture 100 may include a third terminal apparatus 130 and a fourth terminal apparatus 140 that perform bidirectional transmission on the encoded point cloud data, and the bidirectional transmission may occur, for example, during a video conference. For bidirectional data transmission, one of the third terminal apparatus 130 and the fourth terminal apparatus 140 may encode point cloud data (for example, a point cloud bitstream collected by the terminal apparatus), and transmit the encoded point cloud data to the other of the third terminal apparatus 130 and the fourth terminal apparatus 140 through the network 150. The one of the third terminal apparatus 130 and the fourth terminal apparatus 140 may further receive the encoded point cloud data transmitted by the other of the third terminal apparatus 130 and the fourth terminal apparatus 140, and may decode the encoded point cloud data to restore the point cloud data, and may display the point cloud data on an accessible display apparatus according to the restored point cloud data.

In the embodiment in FIG. 1, each of the first terminal apparatus 110, the second terminal apparatus 120, the third terminal apparatus 130 and the fourth terminal apparatus 140 may be a server, a personal computer or a smartphone, but the principle disclosed in the present disclosure may not be limited thereto. This embodiment disclosed in the present disclosure is applicable to a laptop computer, a tablet computer, a media player and/or a dedicated video conference device. The network 150 represents any number of networks that transfer the encoded point cloud data between the first terminal apparatus 110, the second terminal apparatus 120, the third terminal apparatus 130 and the fourth terminal apparatus 140, and includes, for example, a wired communication network and/or a wireless communication network. The network 150 may exchange data in a circuit switched channel and/or a packet switched channel. The network may include a telecommunication network, a local area network, a wide area network and/or the Internet. For the purpose of the present disclosure, unless otherwise explained below, the architecture and topology of the network 150 may be insignificant for operations disclosed in the present disclosure.

Figure 2:
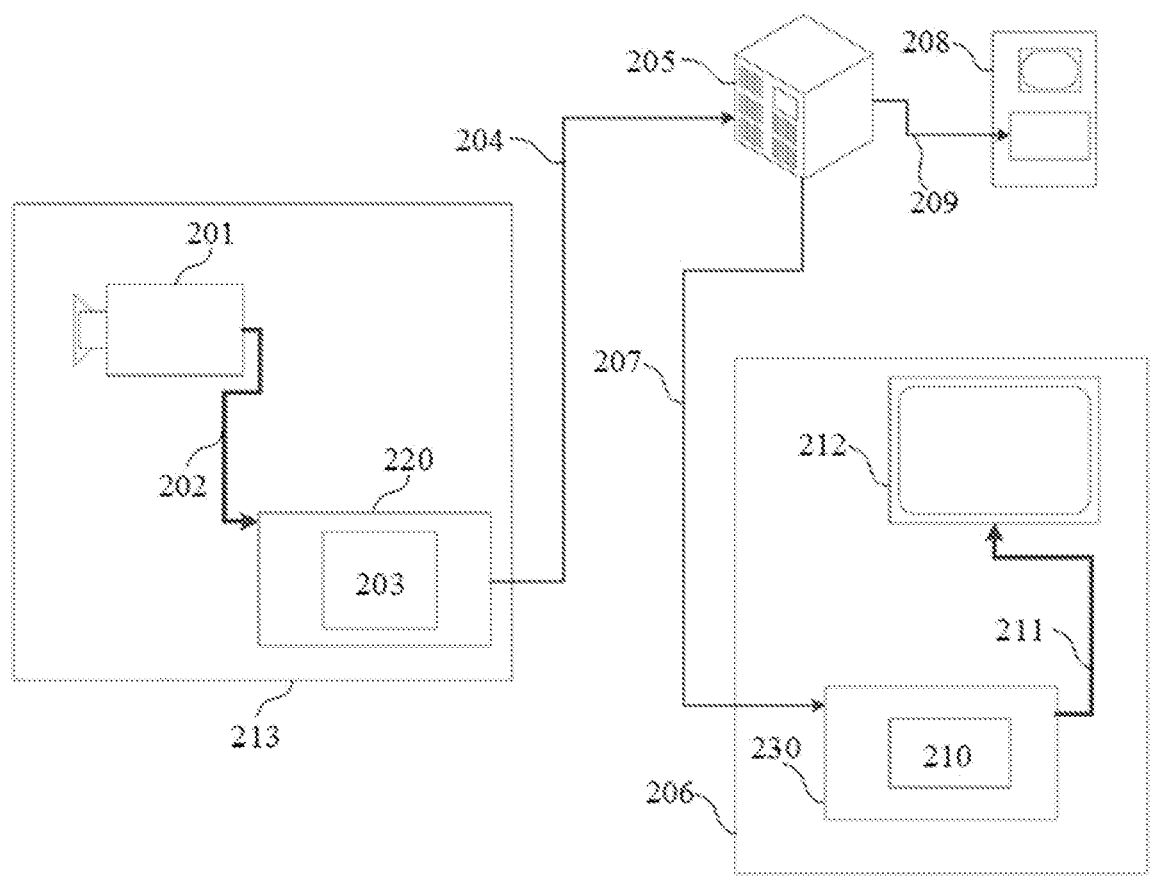
FIG. 2 shows schematic placement manners of a point cloud encoding apparatus and a point cloud decoding apparatus in a streaming transmission environment.

In an embodiment of the present disclosure, FIG. 2 shows placement manners of a point cloud encoding apparatus and a point cloud decoding apparatus in a streaming transmission environment. The subject matter disclosed in the present disclosure may be equally applicable to other applications supporting a point cloud, including, for example, a video conference, a digital television, and storage of compressed point cloud data on digital mediums including a CD, a DVD, a memory stick and the like.

A streaming transmission system may include a collection sub-system 213, the collection sub-system 213 may include a point cloud data source 201 such as a digital camera, and the point cloud data source 201 may create, for example, uncompressed point cloud data 202. In this embodiment, the point cloud data 202 includes a sample photographed by the digital camera. Compared with encoded point cloud data 204 (or encoded point cloud bitstream 204), the point cloud data 202 is depicted as a bold line to emphasize point cloud data of a high data volume, the point cloud data 202 may be processed by an electronic apparatus 220, and the electronic apparatus 220 includes a video encoding apparatus 203 coupled to the video source 201. The video encoding apparatus 203 may include hardware, software or a combination of software and hardware to realize or implement aspects of the disclosed subject matter described below in more detail. Compared with the point cloud data 202, the encoded point cloud data 204 (or the encoded point cloud bitstream 204) is depicted as a fine line to emphasize the encoded point cloud data 204 (or the encoded point cloud bitstream 204) of a relatively low data volume, and may be stored on a streaming transmission server 205 for future use. One or more streaming transmission client sub-systems, for example, a client sub-system 206 and a client sub-system 208 in FIG. 2 may access the streaming transmission server 205 to retrieve point cloud data 207 and point cloud data 209 that are encoded and used as duplicates of the point cloud data 204. The client sub-system 206 may include, for example, a point cloud decoding apparatus 210 in an electronic apparatus 230. The point cloud decoding apparatus 210 decodes the inputted duplicate 207 of the encoded point cloud data, and generates outputted point cloud data 211 that may be presented on a display 212 (for example, a display screen) or another presentation apparatus. In some streaming transmission systems, the encoded point cloud data 204, point cloud data 207 and point cloud data 209 (for example, point cloud bitstreams) may be encoded according to some point cloud encoding/compression standards. An embodiment of these standards may include a standard developed by MPEG for GPCC.

The electronic apparatus 220 and the electronic apparatus 230 may include other components not shown in the drawing. For example, the electronic apparatus 220 may include a point cloud decoding apparatus, and the electronic apparatus 230 may further include a point cloud encoding apparatus.

Technical solutions such as a point cloud encoding and decoding method, a point cloud encoding and decoding apparatus, a computer-readable medium, and an electronic device provided in the present disclosure are described below in detail with reference to specific implementations.

Figure 3:
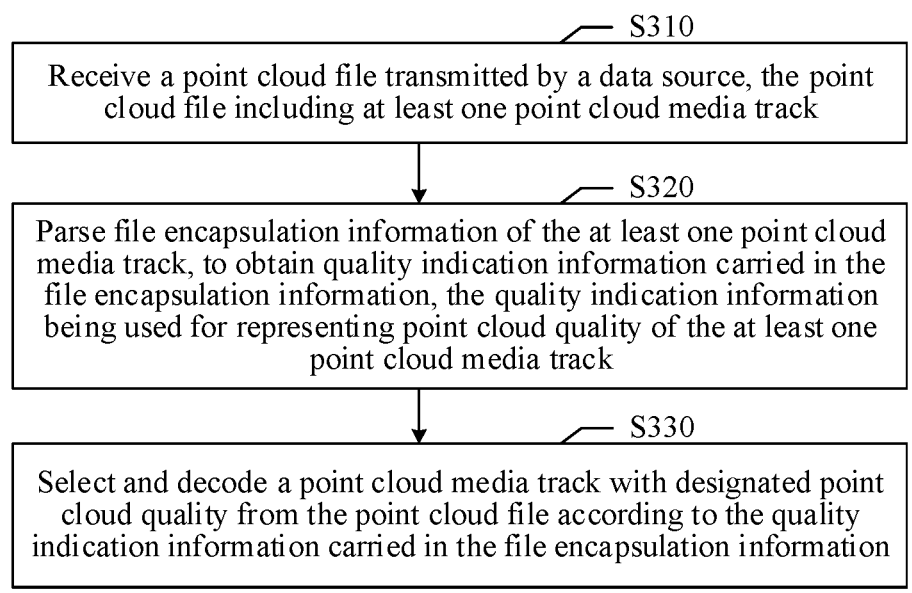
FIG. 3 is a schematic step flowchart of a point cloud decoding method according to certain embodiment(s) of the present disclosure.

FIG. 3 is a step flowchart of a point cloud decoding method according to an embodiment of the present disclosure. The method may be applied to links of a point cloud media system, such as a server, a client and an intermediate node. In this embodiment of the present disclosure, the point cloud decoding method performed by a client device in which a point cloud decoding apparatus is installed is used as an example. As shown in FIG. 3, the point cloud decoding method may include the following step S310 to step S330.

Step S310: Receive a point cloud file transmitted by a data source, the point cloud file including at least one point cloud media track.

According to this embodiment of the present disclosure, in step S310, the point cloud file may include point cloud media tracks having the same point cloud content and having different point cloud quality. Alternative groups corresponding to different point cloud media tracks are encapsulated in the point cloud file, and point cloud media tracks having the same point cloud content and having different point cloud quality may be arranged in the same alternative group. When GPCC point cloud data is encapsulated using a single track, tracks of point cloud content with different quality all belong to the same alternative group. When GPCC point cloud data is encapsulated using a plurality of tracks, geometry component tracks of point cloud content with different quality all belong to the same alternative group, and attribute component tracks may be associated with the geometry component tracks.

Figure 4:
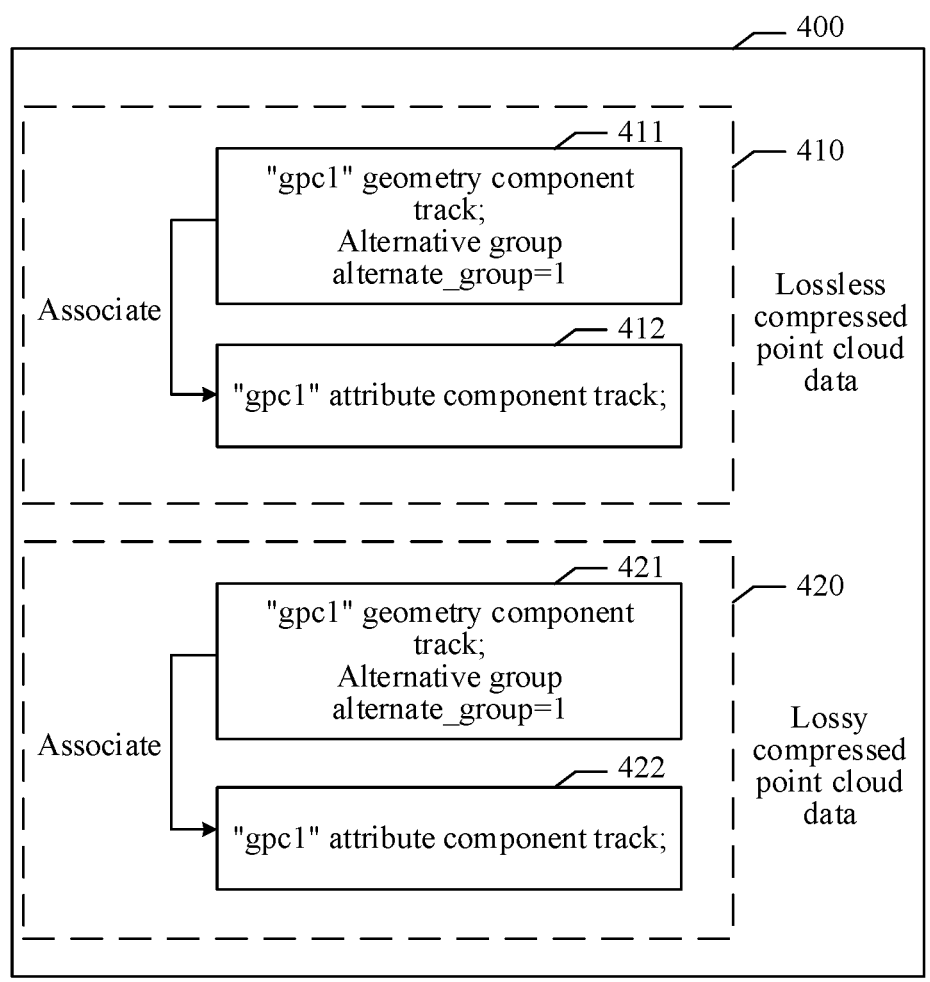
FIG. 4 is a schematic diagram of a multi-track encapsulated alternative group according to certain embodiment(s) of the present disclosure.

FIG. 4 is a schematic diagram of a multi-track encapsulated alternative group according to an embodiment of the present disclosure. As shown in FIG. 4, an alternative group 400 includes a first point cloud data 410 and a second point cloud data 420 that have the same point cloud content. The first point cloud data 410 is lossless compressed point cloud data (Lossless coded GPCC) whose point cloud quality is relatively high, and the second point cloud data 420 is lossy compressed point cloud data (Lossy coded GPCC) whose point cloud quality is relatively low.

The first point cloud data 410 includes a first geometry component track 411 and a first attribute component track 412 associated with the first geometry component track 411, and the second point cloud data 420 includes a second geometry component track 421 and a second attribute component track 422 associated with the second geometry component track 421.

Step S320: Parse file encapsulation information of the at least one point cloud media track, to obtain quality indication information carried in the file encapsulation information, the quality indication information being used for representing point cloud quality of the at least one point cloud media track.

The file encapsulation information is a data box that is used for recording decoding configuration data related to the point cloud file and that is generated when point cloud bitstreams are encapsulated as the point cloud file, and may be, for example, a GPCC decoder configuration record data box (GPCCDecoderConfigurationRecord).

In an embodiment of the present disclosure, the method for parsing file encapsulation information to obtain quality indication information may include: parsing the file encapsulation information of the point cloud media track, to determine at least one quality indication field related to a quality parameter of the point cloud media track; and determining the quality indication information of the point cloud file according to a value of the at least one quality indication field.

In an embodiment of the present disclosure, the quality parameter of the point cloud media track may include at least one of a bitrate and a frame rate of a point cloud bitstream. In some other optional implementations, the quality parameter may further include resolution, picture quality and other media resource quality related parameters.

In an embodiment of the present disclosure, the quality indication information includes at least one of a true quality value, an equivalent quality value, and a quality scale.

The true quality value is a parameter value of the quality parameter. For example, if a bitrate of a point cloud bitstream corresponding to a point cloud media track is 10000 bit/s, a true quality value 10000 may be determined as quality indication information of the point cloud media track. In another example, if a frame rate of a point cloud bitstream corresponding to a point cloud media track is 30 fps, a true quality value 30 may be determined as quality indication information of the point cloud media track.

The equivalent quality value is the number of unit quality parameters that is obtained by comparing the parameter value of the quality parameter with a preset unit quality parameter. For example, if 400 bit/s is used as a unit quality parameter, and a bitrate of a point cloud bitstream corresponding to a point cloud media track is 10000 bit/s, an equivalent quality value 10000/400=25 may be used as quality indication information. When a ratio of the parameter value of the quality parameter to the preset unit quality parameter is a decimal fraction, the ratio may be rounded up to determine the number of unit quality parameters.

The quality scale is scale information used for representing a parameter value range of the quality parameter. For example, for the parameter bitrate, a plurality of different bitrate value ranges may be preset, each bitrate value range corresponds to one bitrate scale, and the bitrate scale is used for representing a quality scale of point cloud quality.

In an embodiment of the present disclosure, the syntax of the GPCC decoder configuration record data box used as the file encapsulation information is as follows:

```
aligned(8) class GPCCDecoderConfigurationRecord {
    unsigned int(8)      configurationVersion = 1;
    unsigned int(8)      profile_idc;
    unsigned int(24)     profile_compatibility_flags;
    unsigned int(8)      level_idc;
    unsigned int(8)      bitrate;
    unsigned int(8)      frame_rate;
    unsigned int(8)      numOfSetupUnits;
    for (i=0; i<numOfSetupUnits; i++) {
        tlv_encapsulation    setupUnit;   //as defined in ISO/IEC 23090-9
    }
    //additional fields
}
``` where bitrate is a quality indication field corresponding to the bitrate, and a value thereof is an unsigned integer whose length is 8 bytes; frame_rate is a quality indication field corresponding to the frame rate, and a value thereof is also an unsigned integer whose length is 8 bytes. The frame rate represented by the quality indication field frame_rate may be an average frame rate of a temporal scale, whose unit is frame/(256 seconds). When a value of the quality indication field frame_rate is 0, it indicates that no frame rate is designated, for example, no average frame rate is designated. For a GPCC bitstream, a GPCC temporal scale may be a subset of frames in the GPCC bitstream, and a frame rate of a sub-sequence formed by the subset of the frames is less than a frame rate of an actual bitstream sequence of the GPCC bitstream. Each GPCC frame may be related to a particular temporal scale. The GPCC bitstream may be carried or stored in one or more temporal scale tracks.

Step S330: Select and decode a point cloud media track with designated point cloud quality from the point cloud file according to the quality indication information carried in the file encapsulation information.

File encapsulation information corresponding to each point cloud media track carries quality indication information of the point cloud media track, and the quality indication information identifies point cloud quality of the point cloud media track in an explicit identification manner. When the point cloud file is transmitted by the data source to a data receiver of the user, the data receiver may decode a point cloud media track with designated point cloud quality according to device performance.

In an embodiment of the present disclosure, by collecting device performance of the data receiver and performing matching detection on the device performance and the quality indication information carried in the file encapsulation information, point cloud quality matching the device performance of the data receiver may be determined, and a point cloud media track with the designated point cloud quality is selected from the point cloud file and decoded.

The device performance may include at least one of hardware performance, software performance and network performance. The hardware performance may include, for example, the device model of the electronic device, the processor model, the memory capacity, the display size and the like. The software performance may include, for example, the program version of the point cloud decoder installed in the data receiver. The network performance may include, for example, the network bandwidth, the network transmission state and the like.

In an embodiment of the present disclosure, by obtaining a quality selection rule configured by the data receiver and performing matching detection on the quality selection rule and the quality indication information carried in the file encapsulation information, point cloud quality matching the quality selection rule configured by the data receiver may be determined, and a point cloud media track with the designated point cloud quality is selected from the point cloud file and decoded.

The quality selection rule may be a selection rule that is used for selecting point cloud data with designated point cloud quality and that is configured, for example, selecting point cloud data whose bitrate is greater than (or less than) a designated value according to a user instruction.

Figure 5:
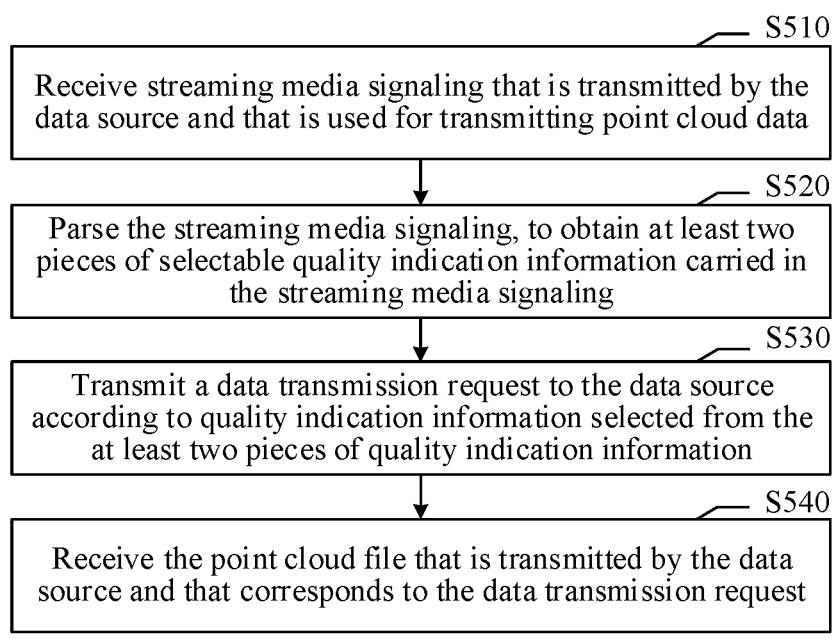
FIG. 5 is a schematic step flowchart of receiving a point cloud file from a data source according to certain embodiment(s) of the present disclosure.

FIG. 5 is a step flowchart of receiving a point cloud file from a data source according to an embodiment of the present disclosure. As shown in FIG. 5, based on the above embodiments, the receiving a point cloud file transmitted by a data source in step S310 may include the following step S510 to step S540.

Step S510: Receive streaming media signaling that is transmitted by the data source and that is used for transmitting point cloud data.

In an embodiment of the present disclosure, the streaming media signaling used for transmitting the point cloud data may be dynamic adaptive streaming over HTTP (DASH) signaling. DASH is an adaptive bitrate streaming technology, and the technology may cause high-quality streaming media to be transferred over the Internet through an HTTP network server.

Step S520: Parse the streaming media signaling, to obtain at least two pieces of selectable quality indication information carried in the streaming media signaling.

In the DASH signaling, selectable quality indication information may be stored using an existing field. For example, bitrates of a plurality of different point cloud media tracks may be indicated using a bandwidth field in the DASH signaling, and frame rates of a plurality of different point cloud media tracks may be indicated using a frameRate field in the DASH signaling. In the DASH technology, a combination of one or more media components is used as a representation, for example, a video file with a resolution may be considered as a representation. According to this embodiment of the present disclosure, a media file of a point cloud media track may be used as a representation, and quality indication information of different point cloud media tracks may be represented using frameRate parameters and/or bandwidth parameters of representations corresponding to the different point cloud media tracks.

Step S530: Transmit a data transmission request to the data source according to quality indication information selected from the at least two pieces of quality indication information.

According to the quality indication information carried in the streaming media signaling and obtained by parsing, one or more pieces of quality indication information may be selected from the quality indication information and used as target point cloud quality, and the data transmission request corresponding to the target point cloud quality may be further transmitted to the data source.

In an embodiment of the present disclosure, the method for transmitting a data transmission request may include: determining a network bandwidth of performing data transmission with the data source; performing matching detection on the network bandwidth and the at least two pieces of quality indication information carried in the streaming media signaling, to select target point cloud quality matching the network bandwidth; and transmitting the data transmission request generated according to the target point cloud quality to the data source.

In an embodiment of the present disclosure, when the network bandwidth is greater than a set threshold, two or more pieces of target point cloud quality may be selected. When the network bandwidth is less than or equal to the set threshold, one piece of target point cloud quality may be selected.

Step S540: Receive the point cloud file that is transmitted by the data source and that corresponds to the data transmission request.

When a data transmission request for one piece of corresponding target point cloud quality is transmitted to the data source according to the quality indication information, the data source may transmit a corresponding point cloud media track to the data receiver based on the request. When a data transmission request for a plurality of pieces of corresponding target point cloud quality is transmitted to the data source according to the quality indication information, the data source may transmit a plurality of corresponding point cloud media tracks with different point cloud quality to the data receiver based on the request.

Figures 6, 7:
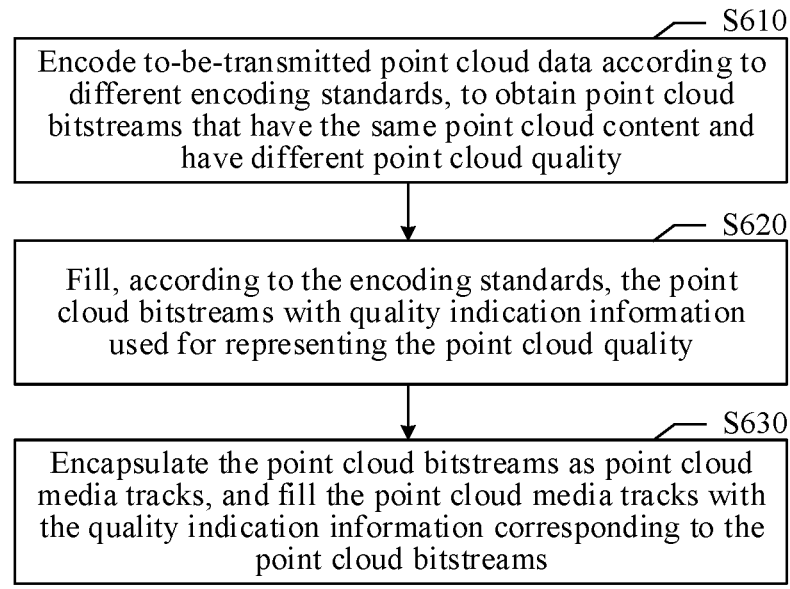
FIG. 6 is a schematic step flowchart of a point cloud encoding method according to certain embodiment(s) of the present disclosure.
FIG. 7 is a schematic diagram of a GPCC bitstream high-level syntax according to certain embodiment(s) of the present disclosure.

FIG. 6 is a step flowchart of a point cloud encoding method according to an embodiment of the present disclosure. The point cloud encoding method may be applied to links of a point cloud media system, such as a server, a client and an intermediate node. In this embodiment of the present disclosure, the point cloud encoding method performed by a server device in which a point cloud encoding apparatus is installed is used as an example. As shown in FIG. 6, the point cloud encoding method may include the following step S610 to step S630.

Step S610: Encode to-be-transmitted point cloud data according to different encoding standards, to obtain point cloud bitstreams that have the same point cloud content and have different point cloud quality.

In certain embodiment(s), point cloud data for a point cloud content may be encoded according to a plurality of different encoding standards to obtain point cloud bitstreams having different point cloud quality. The encoding standards may include parameter values of one or more quality parameters, and combinations of different parameter values of various quality parameters may form a plurality of different encoding standards. For example, when the quality parameter includes a bitrate and a frame rate, the bitrate includes two different bitrate values A1 and A2, and the frame rate also includes two different frame rate values B1 and B2, four encoding standards, that is, A1B1, A1B2, A2B1 and A2B2 corresponding to different quality parameter values may be determined.

Step S620: Fill, according to the encoding standards, the point cloud bitstreams with quality indication information used for representing the point cloud quality.

In an embodiment of the present disclosure, the method for filling the point cloud bitstreams with quality indication information may include: determining parameter values of quality parameters of the point cloud bitstreams according to the encoding standards, and determining, in the point cloud bitstreams, quality indication fields corresponding to the quality parameters; determining, according to the parameter values of the quality parameters, the quality indication information used for representing the point cloud quality; and filling the quality indication fields with the quality indication information according to a correspondence between the quality parameters and the quality indication fields. The quality indication information representing the point cloud quality may be included in a high-level syntax structure such as a sequence parameter set syntax in the point cloud bitstreams.

FIG. 7 is a schematic diagram of a GPCC bitstream high-level syntax according to an embodiment of the present disclosure. As shown in FIG. 7, a sequence parameter set syntax of a point cloud bitstream has a plurality of quality indication fields corresponding to quality parameters. A bitrate field is a quality indication field corresponding to the bitrate, and a value thereof is an unsigned integer whose length is 32 bytes; a frame_rate field is a quality indication field corresponding to the frame rate, and a value thereof is an unsigned integer whose length is 8 bytes.

In an embodiment of the present disclosure, a quality parameter of a point cloud bitstream may include at least one of a bitrate and a frame rate. In some other optional implementations, the quality parameter may further include resolution, picture quality and other media resource quality related parameters.

In an embodiment of the present disclosure, the quality indication information includes at least one of a true quality value, an equivalent quality value, and a quality scale.

The true quality value is a parameter value of the quality parameter. For example, if a bitrate of a point cloud bitstream is 10000 bit/s, a true quality value 10000 may be determined as quality indication information of the point cloud bitstream. In another example, if a frame rate of a point cloud bitstream is 30 fps, a true quality value 30 may be determined as quality indication information of the point cloud bitstream.

The equivalent quality value is the number of unit quality parameters that is obtained by comparing the parameter value of the quality parameter with a preset unit quality parameter. For example, if 400 bit/s is used as a unit quality parameter, and a bitrate of a point cloud bitstream is 10000 bit/s, an equivalent quality value 10000/400=25 may be used as quality indication information. When a ratio of the parameter value of the quality parameter to the preset unit quality parameter is a decimal fraction, the ratio may be rounded up to determine the number of unit quality parameters.

The quality scale is scale information used for representing a parameter value range of the quality parameter. For example, for the parameter bitrate, a plurality of different bitrate value ranges may be preset, each bitrate value range corresponds to one bitrate scale, and the bitrate scale is used for representing a quality scale of point cloud quality.

Step S630: encapsulating the point cloud bitstreams as point cloud media tracks, and filling the point cloud media tracks with the quality indication information corresponding to the point cloud bitstreams.

Each point cloud media track has corresponding file encapsulation information. The file encapsulation information may be, for example, a data box that is used for recording decoding configuration data related to the point cloud file and that is generated when point cloud bitstreams are encapsulated as the point cloud file, and may be, for example, a GPCC decoder configuration record data box (GPCCDecoderConfigurationRecord). After the quality indication field corresponding to the quality indication information is determined in the file encapsulation information of the point cloud media track, the quality indication field in the file encapsulation information may be filled with the quality indication information corresponding to the point cloud bitstream with reference to the quality indication information of the point cloud bitstream.

In an embodiment of the present disclosure, after the point cloud bitstreams are encapsulated as point cloud media tracks, streaming media signaling used for transmitting the point cloud data may be generated according to a data transmission requirement; the streaming media signaling may be the DASH signaling in the above embodiments. The streaming media signaling is filled with the quality indication information corresponding to the point cloud bitstreams, and a filling manner may be filling existing fields in the DASH signaling with values according to quality parameter information of the point cloud media tracks. The streaming media signaling is transmitted to the data receiver, to perform point cloud data transmission between the data source and the data receiver.

In an embodiment of the present disclosure, after the data receiver responds to the streaming media signaling, the data source may receive a data transmission request generated based on the streaming media signaling and transmitted by the data receiver; and transmit a point cloud file to the data receiver according to the data transmission request, where the point cloud file includes point cloud media tracks having the same point cloud content and having different point cloud quality.

Figure 8:
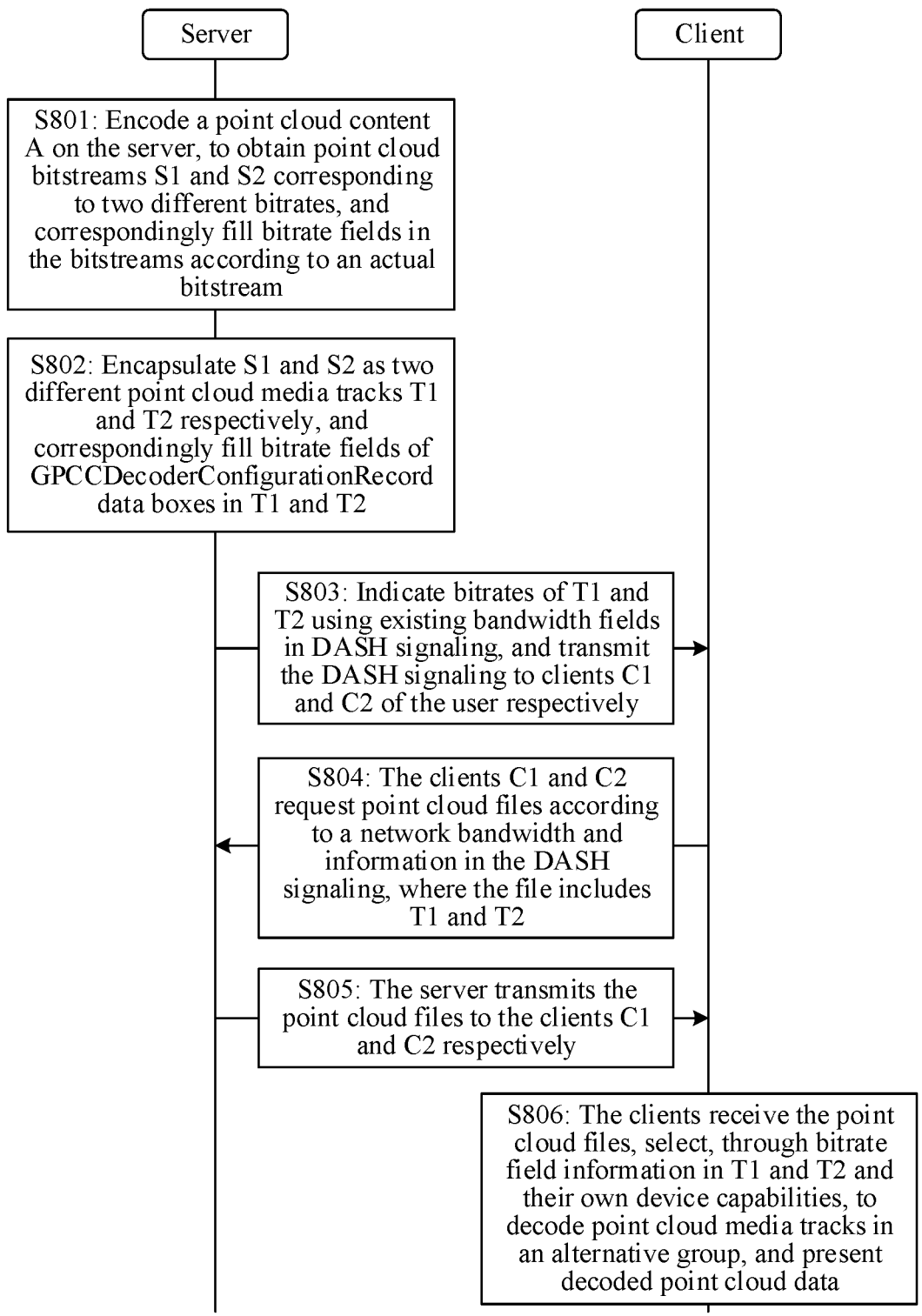
FIG. 8 is a schematic step flowchart of performing point cloud data transmission according to certain embodiment(s) of the present disclosure.

FIG. 8 is a step flowchart of performing point cloud data transmission using a bitrate as quality indication information according to an embodiment of the present disclosure. As shown in FIG. 8, a server is used as a data source producing point cloud data, and a method for performing point cloud data transmission between the server and a client of a user may include the following steps.

Step S801: Encode a point cloud content A on the server, to obtain point cloud bitstreams S1 and S2 corresponding to two different bitrates, and correspondingly fill bitrate fields in the bitstreams according to an actual bitstream. For example, the point cloud bitstream S1 is filled with bitrate=10000; the point cloud bitstream S2 is filled with bitrate=20000.

Step S802: Encapsulate S1 and S2 as two different point cloud media tracks T1 and T2 respectively, and correspondingly fill bitrate fields of GPCCDecoderConfigurationRecord data boxes in T1 and T2. For example, the GPCCDecoderConfigurationRecord data box of the point cloud media track T1 is filled with bitrate=10000; the GPCCDecoderConfigurationRecord data box of the point cloud media track T2 is filled with bitrate=20000.

Step S803: Indicate bitrates of T1 and T2 using existing bandwidth fields in DASH signaling, and transmit the DASH signaling to clients C1 and C2 of the user respectively.

Step S804: The clients C1 and C2 request point cloud files according to a network bandwidth and information in the DASH signaling, where the file includes T1 and T2.

Step S805: The server transmits the point cloud files to the clients C1 and C2 respectively.

Step S806: The clients receive the point cloud files, select, through bitrate field information in T1 and T2 and their own device capabilities, to decode point cloud media tracks in an alternative group, and present decoded point cloud data. For example, C1 selects to decode a media file of T1 in the alternative group and present the decoded media file; C2 selects to decode a media file of T2 in the alternative group and present the decoded media file.

In this embodiment of the present disclosure, the point cloud files requested by the user include all resources in the alternative group, and after the point cloud files are received, the transmitted point cloud data may be selectively decoded.

Figure 9:
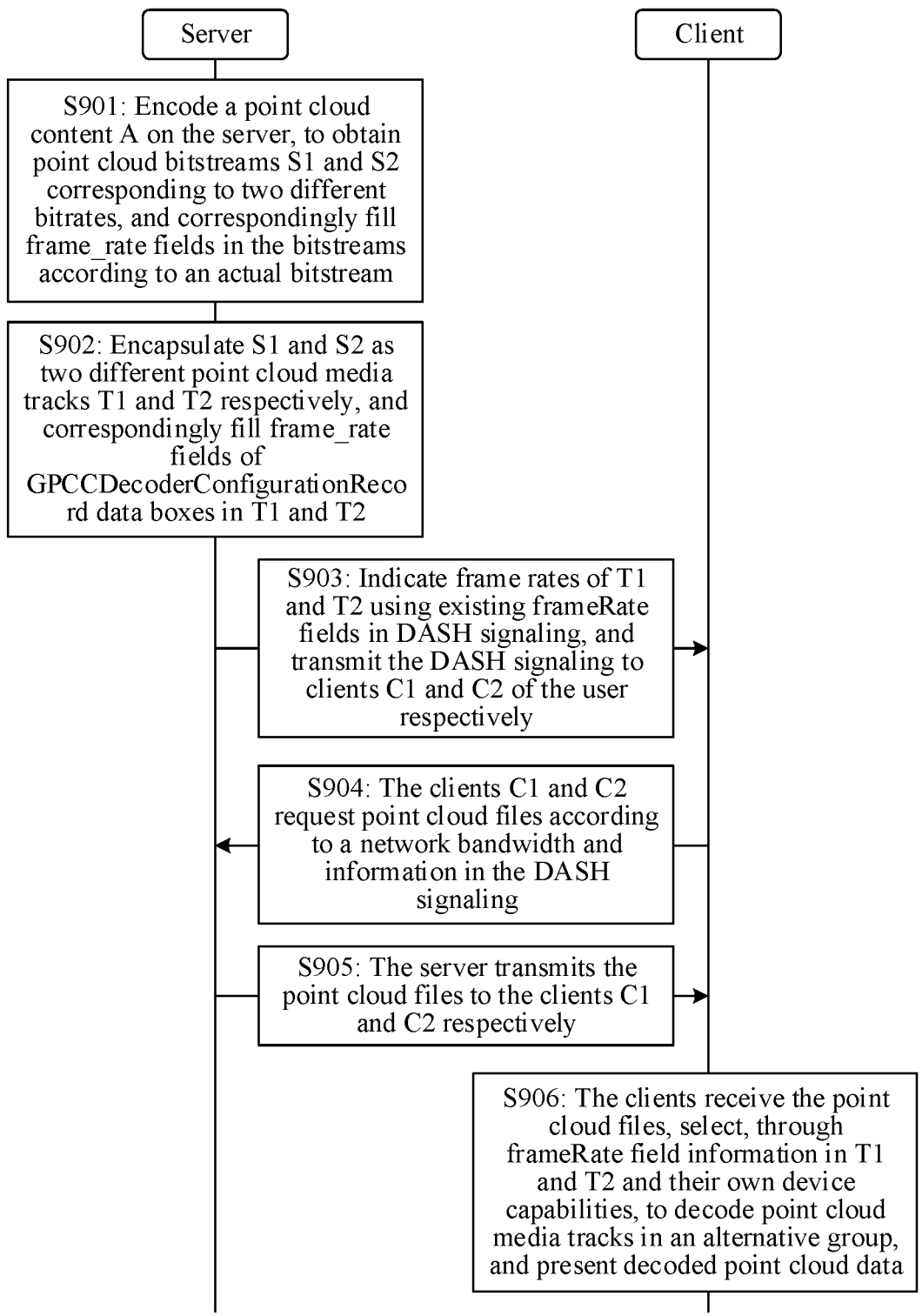
FIG. 9 is a schematic step flowchart of performing point cloud data transmission according to certain embodiment(s) of the present disclosure.

FIG. 9 is a step flowchart of performing point cloud data transmission using a frame rate as quality indication information according to an embodiment of the present disclosure. As shown in FIG. 9, a server is used as a data source producing point cloud data, and a method for performing point cloud data transmission between the server and a client of a user may include the following steps.

Step S901: Encode a point cloud content A on the server, to obtain point cloud bitstreams S1 and S2 corresponding to two different bitrates, and correspondingly fill frame_rate fields in the bitstreams according to an actual bitstream. For example, the point cloud bitstream S1 is filled with frame_rate=30; the point cloud bitstream S2 is filled with frame_rate=60.

Step S902: Encapsulate S1 and S2 as two different point cloud media tracks T1 and T2 respectively, and correspondingly fill frame_rate fields of GPCCDecoderConfigurationRecord data boxes in T1 and T2. For example, the GPCCDecoderConfigurationRecord data box of the point cloud media track T1 is filled with frame_rate=30; the GPCCDecoderConfigurationRecord data box of the point cloud media track T2 is filled with frame_rate=60.

Step S903: Indicate frame rates of T1 and T2 using existing frameRate fields in DASH signaling, and transmit the DASH signaling to clients C1 and C2 of the user respectively.

Step S904: The clients C1 and C2 request point cloud files according to a network bandwidth and information in the DASH signaling. The file requested by C1 includes T1 and T2. In an embodiment, the file requested by C2 includes only T1.

Step S905: The server transmits the point cloud files to the clients C1 and C2 respectively.

Step S906: The clients receive the point cloud files, select, through frameRate field information in T1 and T2 and their own device capabilities, to decode point cloud media tracks in an alternative group, and present decoded point cloud data. For example, C1 selects to decode a media file of T2 in the alternative group and present the decoded media file; C2 decodes a media file of T1 in the alternative group and presents the decoded media file.

In this embodiment of the present disclosure, the point cloud files requested by the user may include only some resources in the alternative group, to save the network bandwidth.

In the technical solution provided in this embodiments of the present disclosure, by adding several descriptive fields to a system layer and including field extensions at a bitstream level and a file encapsulation level, quality scales of a point cloud file and components (geometry, attribute and the like) may be more definitely indicated, so that a client can request the corresponding point cloud file more precisely, and can also select corresponding components according to requirements and performance conditions of the client itself during decoding and presentation.

Although the steps of the method in the present disclosure are described in a specific order in the accompanying drawings, this does not require or imply that the steps have to be performed in the specific order, or all the steps shown have to be performed to achieve an expected result. Additionally or alternatively, some steps may be omitted, a plurality of steps may be combined into one step, and/or one step may be decomposed into a plurality of steps for execution, and the like.

The following describes apparatus embodiments of the present disclosure, and the apparatus embodiments may be used for performing the point cloud encoding and decoding method in the embodiments of the present disclosure.

Figure 10:
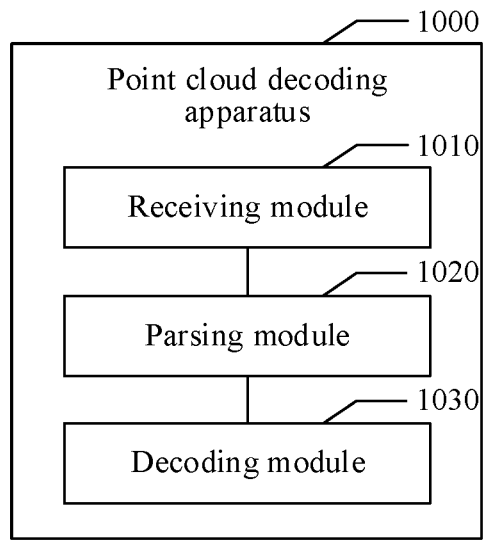
FIG. 10 is a schematic structural block diagram of a point cloud decoding apparatus according to certain embodiment(s) of the present disclosure.

FIG. 10 is a schematic structural block diagram of a point cloud decoding apparatus according to an embodiment of the present disclosure. As shown in FIG. 10, the point cloud decoding apparatus 1000 may include: a receiving module 1010, configured to receive a point cloud file transmitted by a data source, the point cloud file including at least one point cloud media track; a parsing module 1020, configured to parse file encapsulation information of the at least one point cloud media track, to obtain quality indication information carried in the file encapsulation information, the quality indication information being used for representing point cloud quality of the at least one point cloud media track; and a decoding module 1030, configured to select and decode a point cloud media track with designated point cloud quality from the point cloud file according to the quality indication information carried in the file encapsulation information. According to this embodiment of the present disclosure, the point cloud file received by the receiving module 1010 may include point cloud media tracks having the same point cloud content and having different point cloud quality.

In some embodiments of the present disclosure, based on the above technical solutions, the receiving module 1010 includes: a signaling receiving unit, configured to receive streaming media signaling that is transmitted by the data source and that is used for transmitting point cloud data; a signaling parsing unit, configured to parse the streaming media signaling, to obtain at least two pieces of selectable quality indication information carried in the streaming media signaling; a request transmitting unit, configured to transmit a data transmission request to the data source according to quality indication information selected from the at least two pieces of quality indication information; and a file receiving unit, configured to receive the point cloud file that is transmitted by the data source and that corresponds to the data transmission request.

In some embodiments of the present disclosure, based on the above technical solutions, the request transmitting unit includes: a bandwidth obtaining subunit, configured to determine a network bandwidth of performing data transmission with the data source; a bandwidth matching subunit, configured to perform matching detection on the network bandwidth and the at least two pieces of quality indication information carried in the streaming media signaling, to select target point cloud quality matching the network bandwidth; and a request transmitting subunit, configured to transmit the data transmission request generated according to the target point cloud quality to the data source.

In some embodiments of the present disclosure, based on the above technical solutions, the parsing module 1020 includes: an information parsing unit, configured to parse the file encapsulation information of the at least one point cloud media track, to determine at least one quality indication field related to a quality parameter of the point cloud media track; and an information determining unit, configured to determine the quality indication information of the point cloud file according to a value of the at least one quality indication field.

In some embodiments of the present disclosure, based on the above technical solutions, the quality indication information includes at least one of a true quality value, an equivalent quality value, and a quality scale, where the true quality value is a parameter value of the quality parameter, the equivalent quality value is the number of unit quality parameters that is obtained by comparing the parameter value of the quality parameter with a preset unit quality parameter, and the quality scale is scale information used for representing a parameter value range of the quality parameter.

In some embodiments of the present disclosure, based on the above technical solutions, the quality parameter includes at least one of a bitrate and a frame rate of a point cloud bitstream.

Figure 11:
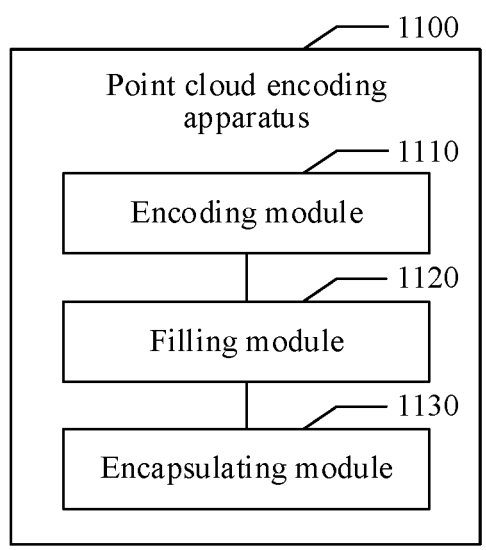
FIG. 11 is a schematic structural block diagram of a point cloud encoding apparatus according to certain embodiment(s) of the present disclosure.

FIG. 11 is a schematic structural block diagram of a point cloud encoding apparatus according to an embodiment of the present disclosure. As shown in FIG. 11, the point cloud encoding apparatus 1100 may include: an encoding module 1110, configured to encode to-be-transmitted point cloud data according to different encoding standards, to obtain point cloud bitstreams that have the same point cloud content and have different point cloud quality; a filling module 1120, configured to fill, according to the encoding standards, the point cloud bitstreams with quality indication information used for representing the point cloud quality; and an encapsulating module 1130, configured to encapsulate the point cloud bitstreams as point cloud media tracks, and fill the point cloud media tracks with the quality indication information corresponding to the point cloud bitstreams.

In some embodiments of the present disclosure, based on the above technical solutions, the point cloud encoding apparatus 1100 further includes: a signaling generating module, configured to generate streaming media signaling used for transmitting the point cloud data; a signaling filling module, configured to fill the streaming media signaling with the quality indication information corresponding to the point cloud bitstreams; and a signaling transmitting module, configured to transmit the streaming media signaling to a data receiver.

In some embodiments of the present disclosure, based on the above technical solutions, the point cloud encoding apparatus 1100 further includes: a request receiving module, configured to receive a data transmission request generated based on the streaming media signaling and transmitted by the data receiver; and a file transmission module, configured to transmit a point cloud file to the data receiver according to the data transmission request, where the point cloud file includes point cloud media tracks having the same point cloud content and having different point cloud quality.

In some embodiments of the present disclosure, based on the above technical solutions, the filling module 1120 includes: a value determining unit, configured to determine parameter values of quality parameters of the point cloud bitstreams according to the encoding standards, and determining, in the point cloud bitstreams, quality indication fields corresponding to the quality parameters; a first information determining unit, configured to determine, according to the parameter values of the quality parameters, the quality indication information used for representing the point cloud quality; and a first information filling unit, configured to fill the quality indication fields with the quality indication information according to a correspondence between the quality parameters and the quality indication fields.

In some embodiments of the present disclosure, based on the above technical solutions, the encapsulating module 1130 includes: a second information determining unit, configured to determine, in file encapsulation information of the point cloud media tracks, quality indication fields corresponding to the quality indication information; and a second information filling unit, configured to fill the quality indication fields in the file encapsulation information with the quality indication information corresponding to the point cloud bitstreams.

Details of the point cloud encoding and decoding apparatus provided in the embodiments of the present disclosure have been described in the corresponding method embodiment. Details are not described herein again.

Figure 12:
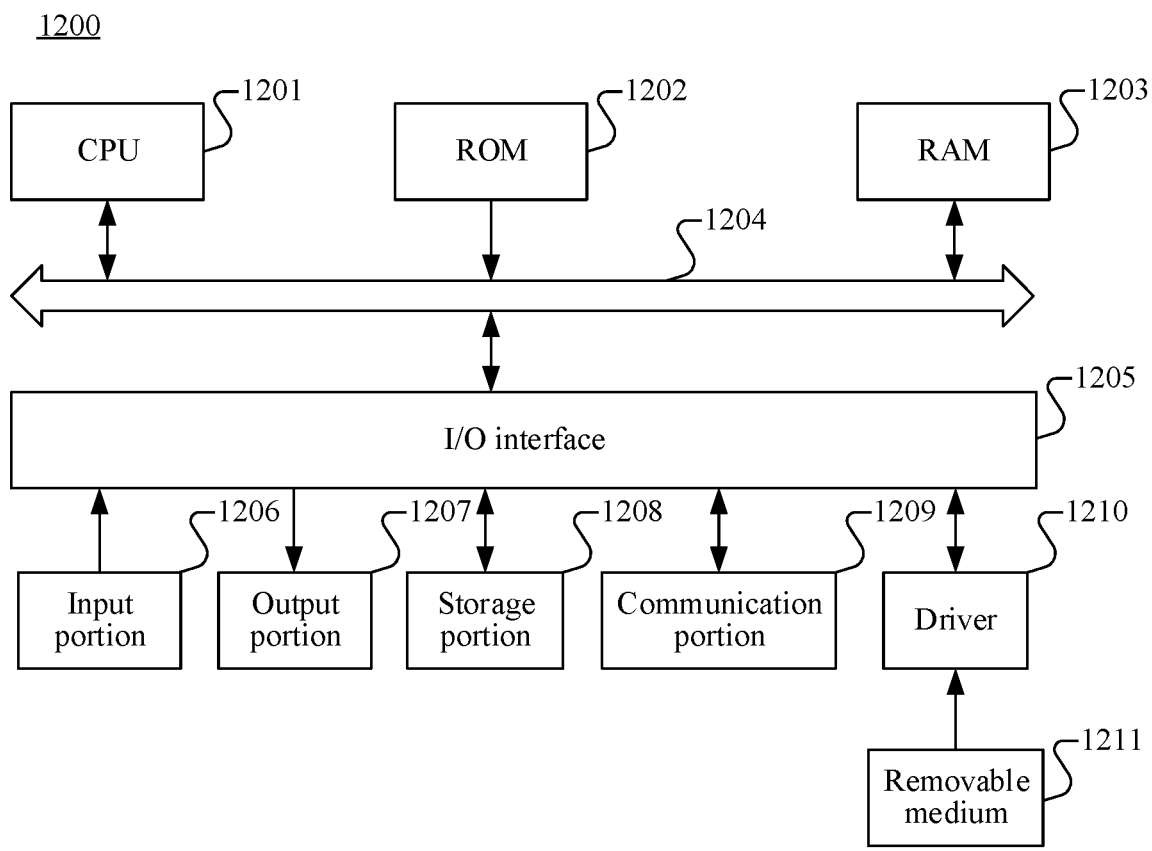
FIG. 12 is a schematic structural block diagram of a computer system according to certain embodiment(s) of the present disclosure.

FIG. 12 is a schematic structural block diagram of a computer system configured to implement an electronic device according to an embodiment of the present disclosure.

A computer system 1200 of the electronic device shown in FIG. 12 is merely an example, and does not constitute any limitation on functions and use ranges of the embodiments of the present disclosure.

As shown in FIG. 12, the computer system 1200 includes a central processing unit (CPU) 1201 that may perform various appropriate actions and processing according to a program stored in a read-only memory (ROM) 1202 or a program loaded from a storage portion 1208 into a random access memory (RAM) 1203. The RAM 1203 further stores various programs and data desired for system operations. The CPU 1201, the ROM 1202, and the RAM 1203 are connected to each other through a bus 1204. An input/output (I/O) interface 1205 is also connected to the bus 1204.

The following members are connected to the I/O interface 1205: an input portion 1206 including a keyboard, a mouse, and the like; an output portion 1207 including, such as, a cathode ray tube (CRT), a liquid crystal display (LCD), and a speaker; the storage portion 1208 including a hard disk or the like; and a communication portion 1209 including a network interface card such as a local area network card and a modem. The communication part 1209 performs communication processing by using a network such as the Internet. A driver 1210 is also connected to the I/O interface 1205 as desired. A removable medium 1211, such as a magnetic disk, an optical disc, a magneto-optical disk, or a semiconductor memory, is mounted on the driver 1210 as desired, so that a computer program read from the removable medium is installed into the storage part 1208 as desired.

Particularly, according to an embodiment of the present disclosure, the processes described in the method flowcharts may be implemented as computer software programs. For example, the embodiments of the present disclosure include a computer program product, the computer program product includes a computer program carried on a computer-readable medium, and the computer program includes program code used for performing the methods shown in the flowcharts. In such an embodiment, the computer program may be downloaded and installed from a network through the communication part 1209, and/or installed from the removable medium 1211. When the computer program is executed by the CPU 1201, the various functions defined in the system of the present disclosure are executed.

The computer-readable medium shown in the embodiments of the present disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or device, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In the present disclosure, the computer-readable storage medium may be any tangible medium including or storing a program, and the program may be used by or in combination with an instruction execution system, apparatus, or device. In the present disclosure, the computer-readable signal medium may include a data signal being in a baseband or propagated as at least a part of a carrier wave, and carries computer-readable program code. The propagated data signal may be in a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code included in the computer-readable medium may be transmitted by using any suitable medium, including but not limited to: a wireless medium, a wired medium, or the like, or any suitable combination thereof.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Other embodiments of the present disclosure will be apparent to a person skilled in the art from consideration of the specification and practice of the present disclosure here. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure.

It is to be understood that the present disclosure is not limited to the precise structures described above and shown in the accompanying drawings, and various modifications and changes can be made without departing from the scope of the present disclosure. The scope of the present disclosure is subject only to the appended claims.

What is claimed is:

1. A point cloud decoding method, comprising:
receiving a point cloud file transmitted by a data source, the point cloud file including at least one point cloud media track and encapsulating an alternative group corresponding to different point cloud media tracks, wherein point cloud media tracks having a same point cloud content and having different point cloud qualities are arranged in the same alternative group; when using a single-track mode for encapsulation of the point cloud file, tracks of point cloud content with different qualities belong to the same alternative group; when using a multi-track mode for encapsulation, geometry component tracks of the point cloud content with different qualities belong to the same alternative group, and attribute component tracks of the point cloud content are associated with the geometry component tracks;
parsing file encapsulation information of the at least one point cloud media track, to obtain quality indication information carried in the file encapsulation information, the quality indication information being used for representing point cloud quality of the at least one point cloud media track; and
selecting and decoding a point cloud media track with designated point cloud quality from the point cloud file according to the quality indication information carried in the file encapsulation information.

2. The point cloud decoding method according to claim 1, wherein receiving the point cloud file comprises:
receiving streaming media signaling that is transmitted by the data source and that is used for transmitting point cloud data;
parsing the streaming media signaling, to obtain at least two pieces of selectable quality indication information carried in the streaming media signaling;
transmitting a data transmission request to the data source according to quality indication information selected from the at least two pieces of quality indication information; and
receiving the point cloud file that is transmitted by the data source and that corresponds to the data transmission request.

3. The point cloud decoding method according to claim 2, wherein transmitting the data transmission request to the data source comprises
determining a network bandwidth of performing data transmission with the data source;
performing matching detection on the network bandwidth and the at least two pieces of quality indication information carried in the streaming media signaling, to select target point cloud quality matching the network bandwidth; and transmitting the data transmission request generated according to the target point cloud quality to the data source.

4. The point cloud decoding method according to claim 1, wherein parsing the file encapsulation information comprises:
parsing the file encapsulation information of the at least one point cloud media track, to determine at least one quality indication field related to a quality parameter of the point cloud media track; and
determining the quality indication information of the point cloud file according to a value of the at least one quality indication field.

5. The point cloud decoding method according to claim 4, wherein
the quality indication field represents a frame rate of a point cloud bitstream, and a value of the quality indication field is an unsigned integer whose length is 8 bytes.

6. The point cloud decoding method according to claim 4, wherein the quality indication information includes at least one of a true quality value, an equivalent quality value, and a quality scale, wherein the true quality value is a parameter value of the quality parameter, the equivalent quality value is the number of unit quality parameters that is obtained by comparing the parameter value of the quality parameter with a preset unit quality parameter, and the quality scale is scale information used for representing a parameter value range of the quality parameter.

7. The point cloud decoding method according to claim 4, wherein the quality indication field represents a bitrate of a point cloud bitstream, and a value of the quality indication field is an unsigned integer whose length is 32 bytes.

8. A point cloud decoding apparatus, comprising: a memory storing computer program instructions; and a processor coupled to the memory and configured to execute the computer program instructions and perform:
receiving a point cloud file transmitted by a data source, the point cloud file including at least one point cloud media track and encapsulating an alternative group corresponding to different point cloud media tracks, wherein point cloud media tracks having a same point cloud content and having different point cloud qualities are arranged in the same alternative group; when using a single-track mode for encapsulation of the point cloud file, tracks of point cloud content with different qualities belong to the same alternative group; when using a multi-track mode for encapsulation, geometry component tracks of the point cloud content with different qualities belong to the same alternative group, and attribute component tracks of the point cloud content are associated with the geometry component tracks;
parsing file encapsulation information of the at least one point cloud media track, to obtain quality indication information carried in the file encapsulation information, the quality indication information being used for representing point cloud quality of the at least one point cloud media track; and
selecting and decoding a point cloud media track with designated point cloud quality from the point cloud file according to the quality indication information carried in the file encapsulation information.

9. The point cloud decoding apparatus according to claim 8, wherein receiving the point cloud file includes:
receiving streaming media signaling that is transmitted by the data source and that is used for transmitting point cloud data;
parsing the streaming media signaling, to obtain at least two pieces of selectable quality indication information carried in the streaming media signaling;
transmitting a data transmission request to the data source according to quality indication information selected from the at least two pieces of quality indication information; and
receiving the point cloud file that is transmitted by the data source and that corresponds to the data transmission request.

10. The point cloud decoding apparatus according to claim 9, wherein transmitting the data transmission request to the data source includes:
determining a network bandwidth of performing data transmission with the data source;
performing matching detection on the network bandwidth and the at least two pieces of quality indication information carried in the streaming media signaling, to select target point cloud quality matching the network bandwidth; and
transmitting the data transmission request generated according to the target point cloud quality to the data source.

11. The point cloud decoding apparatus according to claim 8, wherein parsing the file encapsulation information includes:
parsing the file encapsulation information of the at least one point cloud media track, to determine at least one quality indication field related to a quality parameter of the point cloud media track; and
determining the quality indication information of the point cloud file according to a value of the at least one quality indication field.

12. The point cloud decoding apparatus according to claim 11, wherein the quality indication field represents a frame rate of a point cloud bitstream, and a value of the quality indication field is an unsigned integer whose length is 8 bytes.

13. The point cloud decoding apparatus according to claim 11, wherein the quality indication information includes at least one of a true quality value, an equivalent quality value, and a quality scale, wherein the true quality value is a parameter value of the quality parameter, the equivalent quality value is the number of unit quality parameters that is obtained by comparing the parameter value of the quality parameter with a preset unit quality parameter, and the quality scale is scale information used for representing a parameter value range of the quality parameter.

14. The point cloud decoding apparatus according to claim 11, wherein the quality indication field represents a bitrate of a point cloud bitstream, and a value of the quality indication field is an unsigned integer whose length is 32 bytes.

15. A non-transitory computer-readable storage medium storing computer program instructions executable by at least one processor to perform:
receiving a point cloud file transmitted by a data source, the point cloud file including at least one point cloud media track and encapsulating an alternative group corresponding to different point cloud media tracks, wherein point cloud media tracks having a same point cloud content and having different point cloud qualities are arranged in the same alternative group; when using a single-track mode for encapsulation of the point cloud file, tracks of point cloud content with different qualities belong to the same alternative group; when using a multi-track mode for encapsulation, geometry component tracks of the point cloud content with different qualities belong to the same alternative group, and attribute component tracks of the point cloud content are associated with the geometry component tracks;

parsing file encapsulation information of the at least one point cloud media track, to obtain quality indication information carried in the file encapsulation information, the quality indication information being used for representing point cloud quality of the at least one point cloud media track; and selecting and decoding a point cloud media track with designated point cloud quality from the point cloud file according to the quality indication information carried in the file encapsulation information.

16. The non-transitory computer-readable storage medium according to claim 15, wherein receiving the point cloud file includes:

receiving streaming media signaling that is transmitted by the data source and that is used for transmitting point cloud data;

parsing the streaming media signaling, to obtain at least two pieces of selectable quality indication information carried in the streaming media signaling;

transmitting a data transmission request to the data source according to quality indication information selected from the at least two pieces of quality indication information; and receiving the point cloud file that is transmitted by the data source and that corresponds to the data transmission request.

17. The non-transitory computer-readable storage medium according to claim 16, wherein transmitting the data transmission request to the data source includes:

determining a network bandwidth of performing data transmission with the data source;

performing matching detection on the network bandwidth and the at least two pieces of quality indication information carried in the streaming media signaling, to select target point cloud quality matching the network bandwidth; and transmitting the data transmission request generated according to the target point cloud quality to the data source.

18. The non-transitory computer-readable storage medium according to claim 15, wherein parsing the file encapsulation information includes:

parsing the file encapsulation information of the at least one point cloud media track, to determine at least one quality indication field related to a quality parameter of the point cloud media track; and determining the quality indication information of the point cloud file according to a value of the at least one quality indication field.

19. The non-transitory computer-readable storage medium according to claim 18, wherein the quality indication field represents a frame rate of a point cloud bitstream, and a value of the quality indication field is an unsigned integer whose length is 8 bytes.

20. The non-transitory computer-readable storage medium according to claim 18, wherein the quality indication information includes at least one of a true quality value, an equivalent quality value, and a quality scale, wherein the true quality value is a parameter value of the quality parameter, the equivalent quality value is the number of unit quality parameters that is obtained by comparing the parameter value of the quality parameter with a preset unit quality parameter, and the quality scale is scale information used for representing a parameter value range of the quality parameter.

* * * * *